(No Model.)

J. T. MARTIN.
PEA PLANTER.

No. 355,273. Patented Dec. 28, 1886.

Witnesses:
A. C. Eader
John E. Morris.

Inventor:
John T. Martin
By Chas B. Mann
Attorney

UNITED STATES PATENT OFFICE.

JOHN T. MARTIN, OF ELK RIDGE, MARYLAND.

PEA-PLANTER.

SPECIFICATION forming part of Letters Patent No. 355,273, dated December 28, 1886.

Application filed April 2, 1886. Serial No. 197,501. (No model.)

*To all whom it may concern:*

Be it known that I, JOHN T. MARTIN, a citizen of the United States, residing at Elk Ridge, in the county of Howard and State of Maryland, have invented certain new and useful Improvements in Pea-Planters, of which the following is a specification.

My invention relates to an improved planter designed especially for planting peas, but capable also of planting corn and beans.

Figure 1:
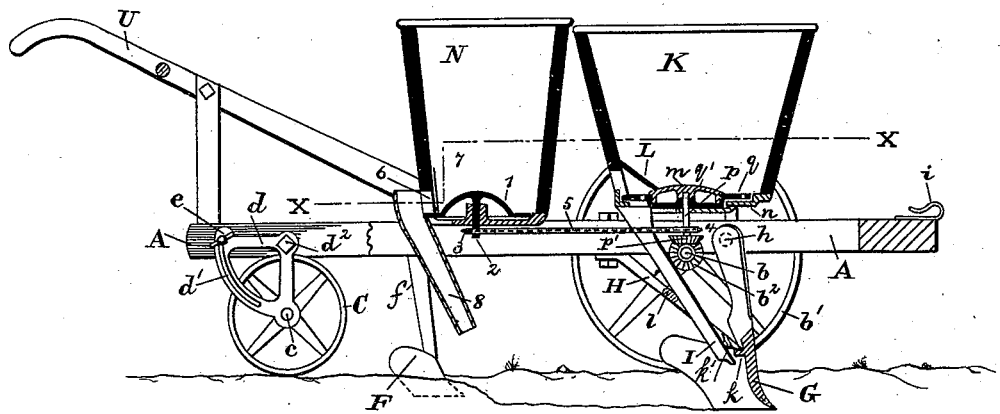
Figure 2:
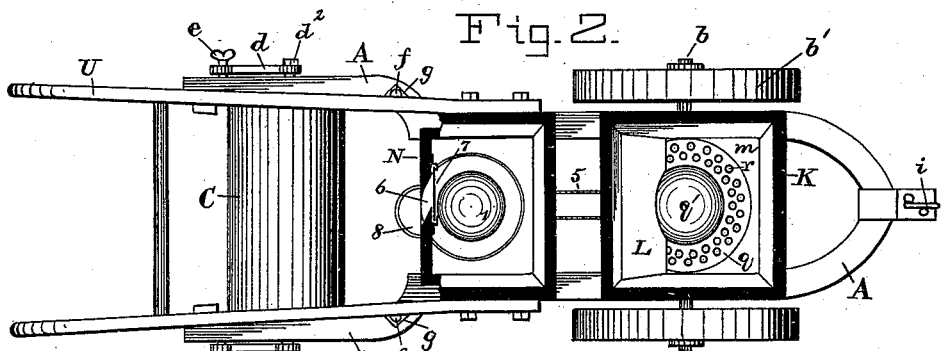
Figure 3:
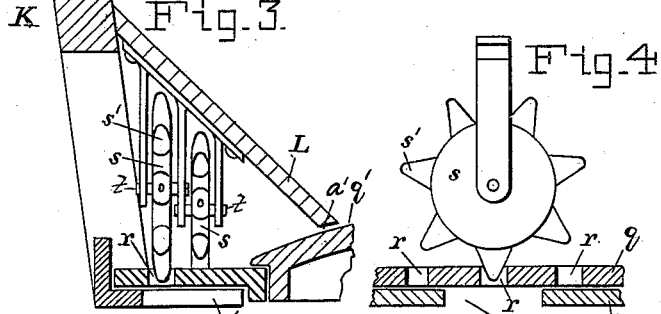
Figure 4:
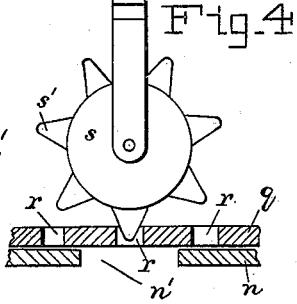
Figure 5:
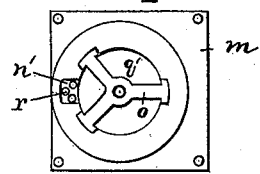
Figure 6:

The invention is illustrated in the accompanying drawings, in which Figure 1 is a view showing a vertical longitudinal section of the machine, except at the rear end, where a side elevation of the roller is shown. Fig. 2 is in part a top view and in part a horizontal section on the line $x\,x$, Fig. 1. The heavy black lines in these figures are sections of the hoppers. Figs. 3 and 4 are views of the feed-hole clearer. Fig. 5 is an inverted or bottom view of the feed device. Fig. 6 is a top view of the brace and feed-tube.

The letter A designates the two side bars comprising the frame, $b$ the axle, and $b'$ the wheels on which the fore part of the frame is mounted. The rear part of the frame is mounted on a roller, C. This roller has journals $c$, which have their bearing in two plates, $d$, provided with a segment-slot, $d'$. Each plate is of right-angled shape, and the journals $c$ turn in one corner, while the corner $d^2$, directly above the journal, is pivoted to the side bar, A. A set-screw, $e$, in the side bar passes through the segment-slot $d'$. It will be seen that this construction allows of the rear end of the frame to be raised or lowered. As seen in Fig. 1, the segment-plate is adjusted to sustain the frame at its highest elevation; but by loosening the set-screw $e$ the roller C may be moved back by the segment-plate turning on its pivoted corner $d^2$, thereby lowering the rear end of the frame. A covering-plow, F, is attached to each bar A by a shank, $f$, at its upper end, passing through the bar and secured by a nut, $g$. The lowering of the frame sets the two covering-plows F deeper in the ground.

The furrow-opener is a plow, G, whose shank is pivoted at $h$ to the bars A—that is, between the two bars. It may thus be raised clear of the ground or swung up forward toward the clevis $i$. The plow has on its rear side a shoulder, $k$.

A V-shaped brace, H, has two arms, one being attached to each bar, and the point $k'$ of the brace abuts upon the shoulder $k$ at the rear side of the plow, and serves to sustain the pivoted plow to its set position. The V-shaped brace has a cross-bar, $l$, and the seed-tube I rests on it.

The seed-hopper K has in its bottom a plate, $m$, provided with a sunk circular seat, $n$, and a tripod-shaped bar, $o$, with a central bearing for a shaft, $p$, which has a bevel wheel, $p'$. The sunk circular seat $n$ has a cut-away place or feed-opening, $n'$. The feed-ring $q$ sets in the sunk circular seat, and has a raised or convex upper surface, $q'$, and the said shaft $p$ depends straight down from its center, and its bevel-wheel $p'$ gears with a like wheel, $b^2$, on the axle. Thereby the feed-ring is made to revolve in a horizontal plane.

The feed-ring is provided on the flat part around the central convex surface with round holes $r$, of size to admit one pea only in each hole. These holes are arranged in two circles. The holes forming one circle come opposite the space between those holes which form the other circle—that is, taking the two circles together, the holes may be said to have a "staggered" position. The peas will roll from the central convex surface onto the flat ring where the holes are. Thereby every pea will feed from the hopper. When the feed-ring $q$ revolves, these holes pass over the feed-opening $n'$ in the bottom plate. As will be seen, the arrangement of holes is such that only one hole at a time approaches the feed-opening, so that the pea occupying one hole will discharge through the feed-opening into the tube I before another hole is exposed over the said opening. While several holes may be over the feed-opening at the same time, it will be understood the holes come to the said opening in succession, or one after the other. In other words, a pea will drop from a hole in the outer circle, then a pea will drop from a hole in the inner circle, then again from the outer circle, and so on alternating.

The advantage here derived is that but one pea at a time is dropped, which is a desideratum.

A striker-bar, L, extends across at one side of the bottom of the seed-hopper, and covers that part of the feed-ring which is above the feed-opening $n'$. One edge of this bar is elevated and bears against the rear wall of the hopper, and the other edge, $a'$, is lower and just above, but does not touch the feed-ring $q$. The striker-bar thus has a downward-inclined position from the rear wall, and the feed-ring $q$ turns freely below its lower edge, $a'$. Thus arranged the feed-ring will receive a pea into each one of its holes $r$, and upon the rotation of the feed-ring below the lower edge of the striker-bar L only one pea can remain in each hole. The inclined position of the striker-bar L forms below it a chamber or space, which is occupied by two clearance-wheels, $s$, mounted on spindles $t$, and turning freely. Each wheel is provided with prongs $s'$, which enter the holes $r$ of the feed-ring, and push down the seed in said holes. By these pronged clearance-wheels the seed-holes are prevented from becoming clogged.

The fertilizer-hopper N sets on the frame back of the seed-hopper. It has in the bottom a feed-plate, 1, which has a convex upper surface and a flat flange all around the convex part. From the lower side of this feed-plate is a vertical shaft, 2, having a sprocket-wheel, 3. A sprocket-wheel, 4, is also on the shaft $p$ of the seed-feed plate, and a chain, 5, connects the said two sprocket-wheels. Thus the fertilizer-feed device is set in motion by the mechanism of the seed-feed device. A discharge-opening, 6, is in the rear wall of the fertilizer-hopper, and a slide, 7, guards said opening. A part of the flat flange of the feed-plate 1, in turning, passes below the discharge-opening 6, and is scraped by a portion of the wall which is above it at one side of said opening. A drill-tube, 8, has its upper end fixed to the hopper, so as to receive the fertilizer that passes through the discharge-opening 6, and the said drill-tube, passing down between the two covering-plows F, projects forward of the same.

The handles U are attached to the frame in any suitable manner.

Having described my invention, I claim and desire to secure by Letters Patent of the United States—

1. A pea-planter having, in combination, a hopper provided in its bottom with a plate having a feed-opening, $n'$, a revoluble feed-ring, $q$, seated on the said bottom plate, and having a central raised or convex surface, and provided on the flat part around the central convex surface with holes $r$ of a size to admit one pea only in each, and a striker-bar, L, secured to the hopper over that part of the feed-ring which is above the said feed-opening, as set forth.

2. A planter having, in combination, a frame, A, supported at its front end by wheels $b'$, a furrow-opening plow, G, pivoted to the frame and provided on its rear side with a shoulder, $k$, a V-shaped brace having two arms rigidly attached to the frame, and its point $k'$ abutting on the said shoulder of the plow, as set forth.

3. A pea-planter having, in combination, a hopper provided in its bottom with a plate having a feed-opening, $n'$, a revoluble feed-ring, $q$, seated on the said bottom plate and provided with holes $r$ of a size to admit one pea only in each, and pronged clearance-wheel $s$, turning above the revoluble feed-ring to push the seed from said holes, as set forth.

4. A pea-planter having, in combination, a hopper provided in its bottom with a plate having a feed-opening, $n'$, a revoluble feed-ring, $q$, seated on the said bottom plate and provided with holes $r$ of a size to admit one pea only in each, a stationary striker-bar, L, above the said ring, and having a downward-inclined position, whereby it forms below it a chamber or space, and pronged clearance-wheel $s$, occupying said chamber and turning above the revoluble feed-ring to push the seed from said hole, as set forth.

In testimony whereof I affix my signature in the presence of two witnesses.

JOHN T. MARTIN.

Witnesses:
 JOHN E. MORRIS,
 JNO. T. MADDOX.